(12) United States Patent
Wolf et al.

(10) Patent No.: US 7,535,837 B2
(45) Date of Patent: May 19, 2009

(54) OPTICAL PACKET TRANSMISSION

(75) Inventors: Michael Joachim Wolf, Mundelsheim (DE); Dieter Beller, Korntal (DE)

(73) Assignee: ALCATEL, Paris (FR)

( * ) Notice: Subject to any disclaimer, the term of this patent is extended or adjusted under 35 U.S.C. 154(b) by 870 days.

(21) Appl. No.: 10/935,275

(22) Filed: Sep. 8, 2004

(65) Prior Publication Data

US 2005/0078684 A1 Apr. 14, 2005

(30) Foreign Application Priority Data

Oct. 9, 2003 (EP) .................................. 03292496

(51) Int. Cl.
*H04J 3/07* (2006.01)
*H04J 14/00* (2006.01)
*H04L 12/43* (2006.01)

(52) U.S. Cl. ...................... 370/230; 370/460; 370/474; 370/505; 370/538

(58) Field of Classification Search .................. None
See application file for complete search history.

(56) References Cited

U.S. PATENT DOCUMENTS

| | | | |
|---|---|---|---|
| 6,559,989 B1 * | 5/2003 | Kim et al. | 398/101 |
| 6,760,549 B2 * | 7/2004 | Chang et al. | 398/51 |
| 6,901,222 B2 * | 5/2005 | Yamashita et al. | 398/162 |
| 6,957,018 B2 * | 10/2005 | Araki et al. | 398/51 |
| 7,174,101 B2 * | 2/2007 | Yon et al. | 398/51 |
| 7,266,295 B2 * | 9/2007 | Ovadia et al. | 398/51 |
| 7,280,478 B2 * | 10/2007 | Oh et al. | 370/235 |
| 2004/0190548 A1 * | 9/2004 | Harel et al. | 370/466 |

FOREIGN PATENT DOCUMENTS

| | | |
|---|---|---|
| EP | 1 076 468 A2 | 2/1999 |
| EP | 0 942 569 A2 | 9/1999 |
| EP | 1 199 827 A1 | 4/2002 |
| WO | WO 02/071791 A2 | 9/2002 |

OTHER PUBLICATIONS

ITU-T G.790/Y.1331 (Mar. 2003).*
Choa F-S et al: "Transparent All-Optical Packet Routing—One Network for all Traffic" Proceedings of the European Conference on Networks and Optical Communications 1999, NOC '99. Broadband Access and Technology, Amsterdam: IOS Press, NL, vol. Part 1, 1999, pp. 217-224, XP000829388.
Jha P K: "A Hybrid Data Transport Protocol for Sonet/ SSDH and Direct Data Overroptical networks" Proceedings of the IEEE Conference on High Performance Switching and Routing, XX, XX, 2000/pp. 13-23, XP001016435.
Tarek S. El-Bawab, et al.: "Optical Packets Switching in Core Networks: Between Vision and Reality" Packet-Oriented Photonic Networks, IEEE Communications Magazine, Sep. 2002, pp. 60-62.

* cited by examiner

*Primary Examiner*—Chi H. Pham
*Assistant Examiner*—Soon D. Hyun
(74) *Attorney, Agent, or Firm*—Sughrue Mion, PLLC

(57) ABSTRACT

A burst mode optical signal is transported as payload of a framed continuous bit-stream optical signal through an optical transport network. The optical bursts are all generated at a common nominal bitrate which equals substantially the payload bitrate of the continuous bit-stream optical signal. The bursts are converted into a continuous bit stream by filling gaps between the bursts with a predefined pattern. The continuous bit stream thus created is then mapped into frames to generate the framed continuous bit-stream optical signal for transmission.

12 Claims, 1 Drawing Sheet

OPTICAL PACKET TRANSMISSION

The invention is based on a priority application EP 03292496.1 which is hereby incorporated by reference.

FIELD OF THE INVENTION

The present invention relates to the field of telecommunications and more particularly to a method and apparatus for converting optical packet bursts into a continuous bitstream optical signal.

BACKGROUND OF THE INVENTION

Packet switched data networks are widely used today. The underlying principle is to chunk data to be transmitted into small packets, each carrying information relating to source and destination, and to switch all these packets independently through the network—a process which is referred to as routing or packet switching.

While packet switching is today done electrically, the definition and development of optical packet switching is currently under way. Optical packets are optical bursts that are to be processed by purely all-optical means, i.e., without optical-to-electrical conversion and electrical processing steps. The optical packets or bursts are delimited by guard time gaps, which enable start and endpoint detection and allow time for the optical processing of the respective packets. An overview over all-optical packet switching can be found in the article "Optical Packet Switching in Core Networks: Between Vision and Reality" by Tarek S. El-Bawab et al, IEEE Communication Magazine Sept. 2002, pages 60-62.

On the other hand, an optical transport network (OTN) has recently been standardized (see ITU-T G.709/Y.1331 02/2001), which will eventually become the predominant transport plane in the future. The principle of the optical transport network is that data signals are transmitted as payload of a framed continuous bit-stream optical signal using one wavelength of a wavelength multiplexed transport signal.

Introduction of optical packet switching systems will probably begin with network islands in for example metropolitan area networks. The connectivity demand, however, will not be restricted to these islands. Though, existing network resources, i.e., the OTN equipment, might be required to interconnect these islands. There will be a need, thus, for sending burst mode optical packet signals as continuous bitrate optical transmission signal over optical transmission lines.

SUMMARY OF THE INVENTION

It is therefore an object of the present invention to provide a method and apparatus for transporting a burst mode optical packet signal over an optical transport network.

These and other objects that appear below are achieved by a method of transporting a burst mode optical signal as payload of a framed continuous bit-stream optical signal through an optical transport network. The method generates optical bursts at a common nominal bitrate which equally substantially the payload bitrate of the continuous bit-stream optical signal. The bursts are converted into a continuous bit stream by filling gaps between the bursts with a predefined pattern. The continuous bit stream thus created is then mapped into frames to generate the framed continuous bit-stream optical signal for transmission.

In other words, the present invention loads a bitrate restrictions to the all-optical packet switching system to achieve a simple interworking function. This allows to convert the burst mode packet signal into a continuous bit stream by simply filling the guard time gaps with a predefined filling pattern.

BRIEF DESCRIPTION OF THE DRAWINGS

A preferred embodiment of the present invention will now be described with reference to the accompanying drawings in which.

DETAILED DESCRIPTION OF THE INVENTION

Figure 1:
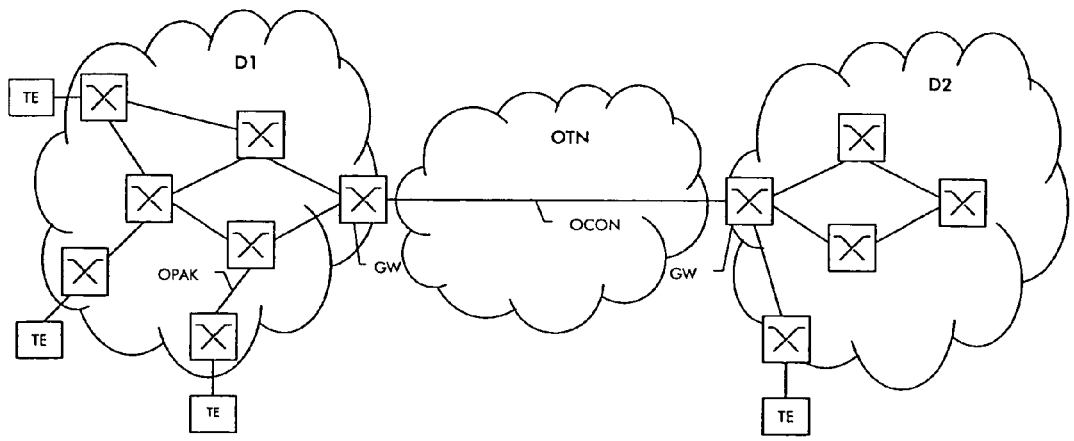
FIG. 1 shows an example network topology.

A sample network is shown in FIG. 1. It consists of a first all-optical packet switched network domain D1 and a second all-optical packet switched network domain D2. These network domains are composed of interconnected optical switches. Some terminals TE shown by way of example are connected to either of the two network domains. The signals exchanged within these two domains are burst mode optical packet signals. Each packet has a header and a data portion and the packets are delimited by a guard time of a variable but at least certain minimum length. The packets are created and terminated in the terminals TE, while processing by the optical switches is all-optical.

In order to allow users connected to domain D1 to communicate with users connected to domain D2, a connection over an optical transmission network OTN exists between gateway nodes GW of the two domains. Signals transmitted along a connection in the OTN are framed transmission signals of a defined constant bitrate, which thus form a continuous optical bit-stream. The invention addresses the conversion function between the optical packet switched network domains (or islands) D1, D2 and the optical transmission network OTN in the gateway nodes GW.

A basic idea of the present invention is to impose a restriction on the bitrate of the individual optical packets exchanged in the packet switched network domains to simplify the conversion into a constant bitrate signal. In particular, the common nominal bitrate of the optical packets is chosen to equal one of the payload bitrates allowed for the OTN according to ITU-T G.709. The interworking function according to the invention requires that all optical packets are of equal bitrate, which is the one of the three defined OTN payload bitrate levels (OPU1, OPU2, or OPU3; OPU: optical payload unit).

These requirements load a slight increase of complexity to the all optical packet switch system. In particular, the transmitter in the terminal equipment has to use the bit rates as defined by G.709 and its clock accuracy needs to exceed (only) slightly that of the OTN, i.e., 20 ppm. On the other hand, the benefit of such solution is that the guard time between the optical packets can simply be filled with a fixed pattern for transmission of a burst mode optical packet signal over the OTN. The invention thus trades complexity in the packet network against a simplified conversion function.

Figure 2:
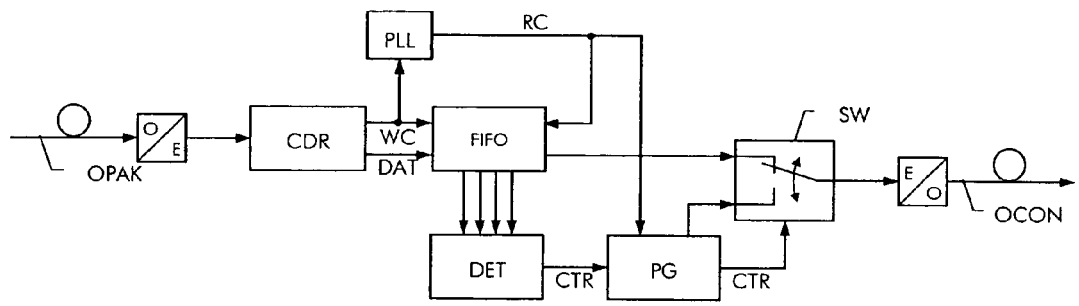
FIG. 2 shows the conversion of a optical packet signal into a continuous bitstream.
Figure 3:
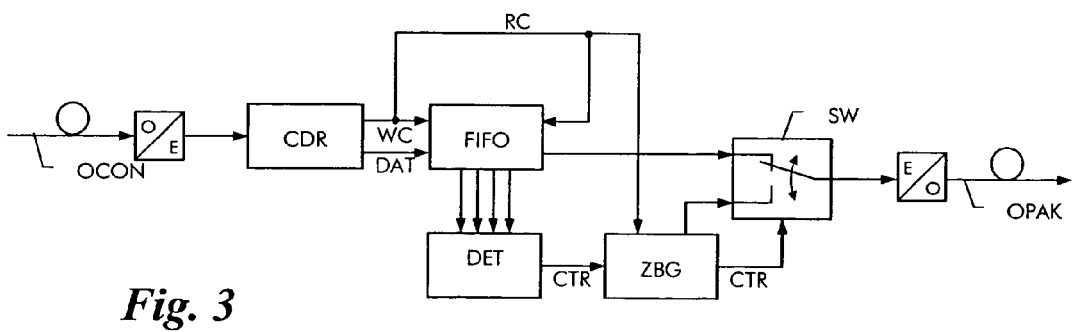
FIG. 3 shows the extraction and recovery of the original optical packet signal from the continuous bitstream.

The gateway functions are shown in FIGS. 2 and 3. FIG. 2 shows a circuit in the gateway nodes GW for mapping burst mode optical packet signals into a framed transmission signal of the OTN. The received optical packets signal OPAK is converted to an electrical signal by an O/E converter and then fed to a clock data recovery CDR, which outputs clock WC and data signal DAT. Clock signal WC is used as write clock to write the data signal DAT into a first-in-first-out buffer memory FIFO.

The clock signal WC is also fed to a phase-locked loop PLL, the output of which is used as a read clock RC for reading out the buffer memory FIFO. Pauses between packets are represented as sequences with bits with value zero. A bit sequence detector DET permanently monitors the contents of the buffer memory FIFO to detect guard time gaps between packets, i.e., sequences of bits with value zero in the buffer. If such time gaps are detected, detector DET generates a control signal CTR, in response to which a bit pattern generator GEN generates a predefined bit pattern as filling pattern for the time gap. The control signal CTR is also forwarded to a switch SW, which selects either the output of the buffer memory FIFO or, driven by the control signal, the output of the pattern generator GEN. The selected signal is then fed to an E/O converter, which converts the selected signal into an optical signal for output to the OTN network.

The circuit fills the guard time between the packets with a predefined bit pattern and thus creates a continuous bitstream, which has the bitrate of the OTU payload (OPUk). A mapper (not shown) maps the continuous bitstream into frames to create the framed transport signal OCON according to ITU-T G.709.

The reverse function, i.e., a circuit for extracting optical packets from a continuous bitstream is shown in FIG. 3.

A received continuous bitstream signal OCON is converted to electrical using O/E converter O/E. The converted electrical signal is fed to a clock data recovery CDR, which creates clock WC and data signal DAT. The data signal is written into a buffer memory FIFO using clock signal WC as write clock. The same clock signal is also used as read lock RC to read the data signal back out again from the buffer FIFO. A bit pattern detector permanently monitors the buffer contents for the predefined filing pattern, i.e, for a bit sequence which corresponds to a filled guard time gap. If detector DET detects a guard time gap, it generates a control signal for a switch SW and a zero bit generator ZBG. The zero bit generator creates "zero bits", i.e., bits with value zero to simulate the original time gaps between the data packets. The switch selects the output of the buffer FIFO or, under control of the control signal CTR, the output of the zero bit generator ZBG. The selected signal is fed to a E/O converter, which converts the signal from the electrical into the optical domain.

The circuit of FIG. 3 thus replaces the predefined filling pattern by zero bits that will correspond to the original guard time gaps between optical packets. Its output is an optical packet signal OPAK.

Overhead terminating functions and demapper for extracting the payload from received frames are not shown in FIG. 3 but would nevertheless typically be present in a receive-end network element. Such functions are, however, well known to those skilled in the art and can thus be added without undue experimentation.

It should be noted that the bitrate of the packets is chosen to equal either of the three bitrate levels defined for OTN, i.e., 2,488320, 9,995276962 or 40,150519322 Gbit/s and that conversion takes only place to an OPUk signal of the appropriate rate. However, it is naturally possible to mix packets of different rates in the packet switched network and separate them at the gateway network elements GW.

In order to meet the specifications of the OTN, the following restrictions on the packet switch system are foreseen. The payload field of each packet shall contain a binary encoded signal with signal statistics according to ITU-T G.709 and the clock accuracy with which the packets are created needs to exceed that of the OTN slightly, i.e., 20 ppm, in order to allow for frequency transients while filling the guard time gaps with the fixed filling pattern. The guard time may not allow to insert exactly an integer number of fixed pattern bits. Therefore it may be necessary to temporarily buffer the data burst and read out at a slightly modified frequency.

For easy removal of the pattern at the destination the pattern may carry a start and a stop indication (binary encoded) which should be protected against simulation by a CRC technique. This feature requires further buffering of the burst signals for doing the processing.

In a further improvement of the present invention, the packet headers are created at a lower bitrate than the payload fields. This simplifies header processing in the packet switched network because at lower bitrates no distortion compensation would be necessary. Moreover, the header rate is chosen to be the same for all three bitrate levels of the OTN.

In particular, it is foreseen that header bitrate is $1/N_x$ of the payload bit rate for OPUk, i.e., for OPU1: $N_1=4$ ($\rightarrow$622.080 Mbit/s $\{-0.42\%\}$)
for OPU2: $N_2=16$ ($\rightarrow$624.705 Mbit/s $\{-0.00\%$, nominal value$\}$)
for OPU3: $N_3=64$ ($\rightarrow$627.352 Mbit/s $\{+0.42\%\}$)

The clock and data recovery function for the headers in the packet switched network has thus to deal with clocks in the range of +/−500 ppm in order to allow for the unique header bitrate of 624.705 Mbit/s nominally. From the point of view of the optical transmission network OTN, every header bit is simply seen as 4, 16 or 64 identical bits. Restrictions for the header code points can be foreseen in addition to meet the signal statistic requirements of the OTN.

What is claimed is:

1. A method of transporting a burst mode optical signal as a payload of a framed continuous bit-stream optical signal over an optical transport network, the method comprising the steps of:
   generating optical bursts at a common nominal bitrate equal to a payload bitrate of the continuous bitstream optical signal;
   converting said bursts into a continuous bit stream by filling gaps between the bursts with a predefined pattern; and
   mapping said continuous bit stream into frames to generate said framed continuous bitstream optical signal for transmission.

2. A method according to claim 1, wherein said optical bursts comprising a payload and a header section and wherein said payload section is generated with said payload bitrate of the continuous bit-stream optical signal and wherein said header section is generated with a lower bitrate than said payload bitrate.

3. A method according to claim 2, wherein the bitrate of the header is lower as said payload bitrate by an integer factor, preferably by a power of 2.

4. A method according to claim 1, wherein the nominal bitrate of the burst mode optical signal is either of the three payload bitrates defined in International Telecommunicationn Union Telecommunication Standardization Sector (ITU-T) G.709.

5. A method according to claim 1, wherein the burst mode optical signal has a nominal bitrate prior to said mapping.

6. A method according to claim 5, wherein the nominal bitrate of the burst mode optical signal is either of the three payload bitrates defined in International Telecommunication Union Telecommunication Standardization Sector (ITU-T) G.709.

7. A network element interfacing an optical packet network and an optical transport network, said network element comprising
- a first interface which receives a burst mode optical signal from said optical packet network;
- a second interface which transmits a framed continuous bit-stream optical signal towards the optical transport network;
- a detector for detecting pauses between bursts of said burst mode optical signal;
- a pattern generator for inserting a filling pattern into said pauses detected by said detector to generate a continuous bitstream;
- and a mapper for mapping said continuous bit stream into frames to generate said framed continuous bit-stream optical signal for transmission.

8. A network element interfacing an optical packet network and an optical transport network, said network element comprising
- a first interface which receives a framed continuous bit-stream optical signal from the optical transport network, said continuous bitstream optical signal carrying as payload a burst mode optical signal with pauses between gaps being filled with a filling pattern;
- a second interface which transmits a burst mode optical signal towards said optical packet network;
- a detector for detecting sequences filled with said fixed pattern in said payload; and
- a zero-bit generator for replacing said filling pattern by pauses to recover said burst mode optical signal.

9. A system comprising a terminal for an optical packet network and a network element interfacing said optical packet network to an optical transport network, wherein said network element comprises:
- a first interface which receives a burst mode optical signal from said optical packet network;
- a second interface which transmits a framed continuous bit-stream optical signal towards said optical transport network;
- a detector for detecting pauses between bursts of said burst mode optical signal;
- a pattern generator for inserting a filling pattern into said pauses detected by said detector to generate a continuous bitstream; and
- a mapper for mapping said continuous bit stream into frames to generate said framed continuous bit-stream optical signal for transmission,
- and wherein said terminal is adapted to create a burst mode optical signal with a nominal bitrate of either of the three payload bitrates defined in International Telecommunication Union Telecommunication Standardization Sector (ITU-T) G.709.

10. The system according to claim 9, wherein said terminal has a clock accuracy of less than 20 parts per million (ppm).

11. The system according to claim 9, further comprising an optical switch for said optical packet network, wherein said optical switch processes headers of optical packets of received burst mode optical signals with a tolerance against clock deviations in the header bitrate of substantially 500 parts per million (ppm) at a nominal bitrate of 624,705 Mbit/s.

12. The system according to claim 9, further comprising a second network element for interfacing said optical transport network to a second optical packet network, said second network element comprising
- a first interface which receives said framed continuous bitstream optical signal from said optical transport network, said continuous bitstream optical signal carrying as payload said burst mode optical signal with pauses between gaps being filled with a filling pattern;
- a second interface which transmits a recovered burst mode optical signal towards said second optical packet network;
- a detector for detecting sequences filled with said fixed pattern in said payload; and
- a zero-bit generator for replacing said filling pattern by pauses to recover said burst mode optical signal.

\* \* \* \* \*